United States Patent [19]

Dorsch et al.

[11] Patent Number: 4,563,985

[45] Date of Patent: Jan. 14, 1986

[54] CAM SHAFT DRIVE OF AN INTERNAL COMBUSTION ENGINE

[75] Inventors: Heinz Dorsch, Weissach-Flacht; Michael Beer, Wimsheim, both of Fed. Rep. of Germany

[73] Assignee: Dr. Ing. h.c.F. Porsche Aktiengesellschaft, Weissach, Fed. Rep. of Germany

[21] Appl. No.: 589,319

[22] Filed: Mar. 14, 1984

[30] Foreign Application Priority Data

Mar. 15, 1983 [DE] Fed. Rep. of Germany ....... 3309152
Mar. 16, 1983 [DE] Fed. Rep. of Germany ....... 3309376

[51] Int. Cl.⁴ .................................................. F01L 1/46
[52] U.S. Cl. ................................. 123/90.31; 123/90.27
[58] Field of Search ........................... 123/90.31, 90.27

[56] References Cited

U.S. PATENT DOCUMENTS

| | | | |
|---|---|---|---|
| 1,622,491 | 3/1927 | Coatalen et al. | 123/90.15 X |
| 1,691,408 | 11/1928 | Palmer | 123/90.31 X |
| 2,857,773 | 10/1958 | Slonek | 123/90.31 X |
| 3,361,000 | 1/1968 | Buchwald | 123/90.31 |
| 3,732,745 | 5/1973 | Jackson | 123/90.31 X |
| 4,438,735 | 3/1984 | Burandt | 123/90.31 X |

FOREIGN PATENT DOCUMENTS 2502033 7/1975 Fed. Rep. of Germany ... 123/90.31

*Primary Examiner*—W. R. Cline
*Assistant Examiner*—Peggy A. Neils
*Attorney, Agent, or Firm*—Barnes & Thornburg

[57] ABSTRACT

The cam shaft carried in the cylinder head is driven by the crank shaft with a gear drive that is borne or supported partly in the crank housing and partly in a gear housing flangely attached to the crank housing. In order to compensate for the thermal induced increase in the distance of the cam shaft with respect to the crank shaft and to hold the torsional flank play at the gear teeth constant, the gear wheel engaging with the cam shaft gear wheel is arranged on a line extending approximately perpendicularly to the connection line between the cam shaft and the crank shaft.

11 Claims, 2 Drawing Figures

CAM SHAFT DRIVE OF AN INTERNAL COMBUSTION ENGINE

BACKGROUND AND SUMMARY OF THE INVENTION

The invention relates to a cam shaft drive of an internal combustion engine of the type having a cam shaft bearingly supported in the cylinder head of a combustion engine by means of a toothed gear transmission including several toothed gear wheels connecting the engine crank shaft with the cam shaft, which gear wheels are arranged partly at the frontal side in the crank shaft housing and partly in a gear housing flangedly connected to the crank shaft housing.

During warm up of an internal combustion engine, the temperature of the cylinders and the cylinder head increases faster and achieves a higher level than the temperature of the gear housing and cam shaft driving gear drive arrangement flangedly attached at the outside of the engine crank shaft housing. Consequently, the distance between the crank shaft and the cam shaft grows faster and is all together larger than the entire temperature dependent length extension of the gear drive arrangement. With the use of a customary arrangement of the toothed gear wheels, as shown in the German published unexamined application (DE-OS) No. 25 02 033, there will thereby be a strong increase in the torsional backlash at the toothed gear wheel intermeshing with the cam shaft toothed gear wheel, with a resultant higher development of noises and damage to the gear tooth profile. These difficulties increase if the toothed gear wheels are constructed of a material with a smaller thermal elongation coefficient than the material of the cylinder head and the crank shaft housing.

It is therefore an object of the invention to create a compensation of these different thermal expansions and therewith avoid an enlargement of the torsional gear tooth backlash during the warm up of the combustion engine.

To solve this problem, an arrangement is proposed according to the invention wherein the axial middle of the toothed gear wheel engaged with the cam shaft toothed gear wheel is disposed at an outgoing line extended from the axial middle of the cam shaft toothed wheel approximately perpendicularly to a connection line connecting the axial middles of the crank shaft toothed gear wheel and the cam shaft toothed gear wheel.

If according to the invention the toothed gear wheel intermeshing in the cam shaft gear wheel at the cam shaft is disposed at or in the region of a line extending perpendicular to a connection line between the cam shaft and the engine crank shaft, during the increase in the distance between the cam shaft and crank shaft, the cam shaft gear wheel can roll away in a curved manner about the axis of the gear wheel engaged therewith so that no gear tooth play increase occurs. Optimal conditions result with an exactly perpendicular arrangement or alignment. But also deviations from the perpendicular up to about 30° still lead to a satisfactory result.

Certain preferred embodiments are configured wherein the axial middles of the crank shaft toothed gear wheel, the cam shaft toothed gear wheel, the intermediary toothed gear wheel, as well as the intermediary toothed gear wheel for the crank shaft toothed gear wheel are located approximately at the corners of a rectangle.

Other preferred embodiments are configured wherein the cam shaft toothed gear wheel is immediately fastened at the cam shaft and is surrounded by the gear housing.

Still other preferred embodiments are configured wherein the toothed wheels are made of a steel alloy and the crank shaft housing, the cylinder head, as well as the gear housing are made of an aluminum alloy.

Further objects, features, and advantages of the present invention will become more apparent from the following description when taken with the accompanying drawings which show, for purposes of illustration only, an embodiment embodiments in accordance with the present invention.

DETAILED DESCRIPTION OF THE DRAWINGS

Figure 1:
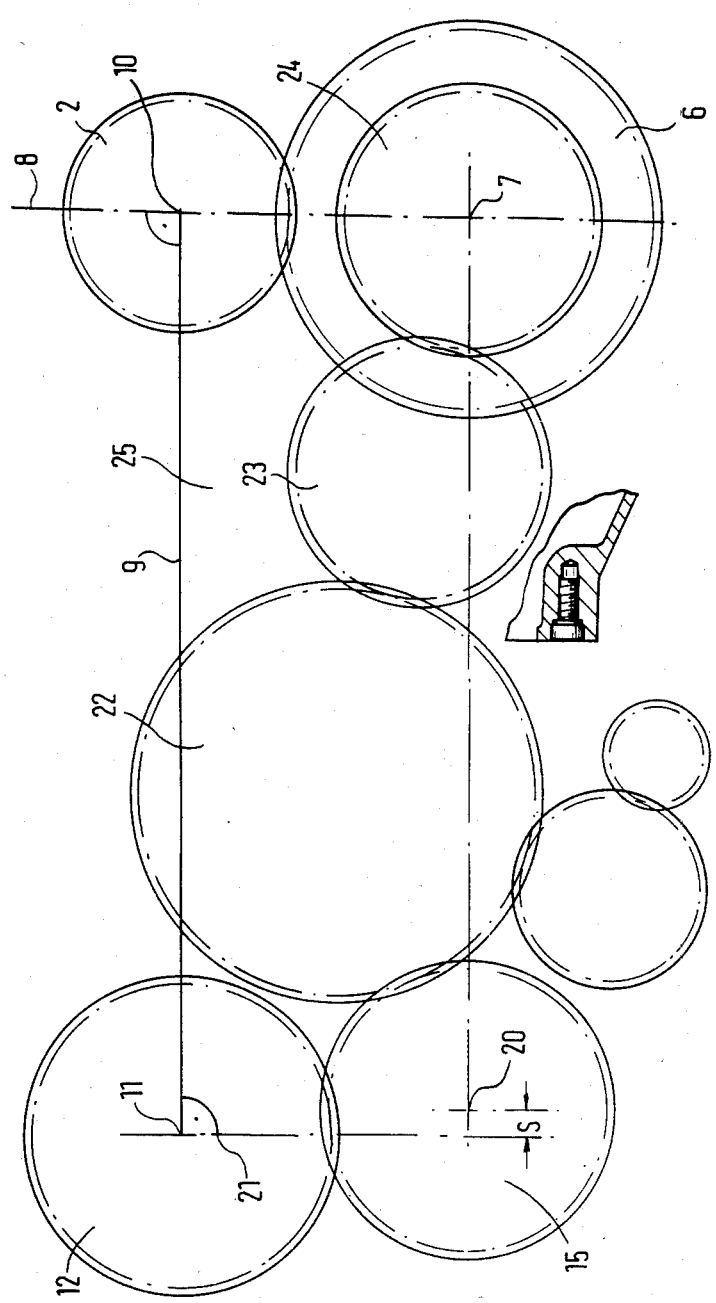
FIG. 1 is a front schematic view of the gear drive arrangement constructed in accordance with a preferred embodiment of the invention.
Figure 2:
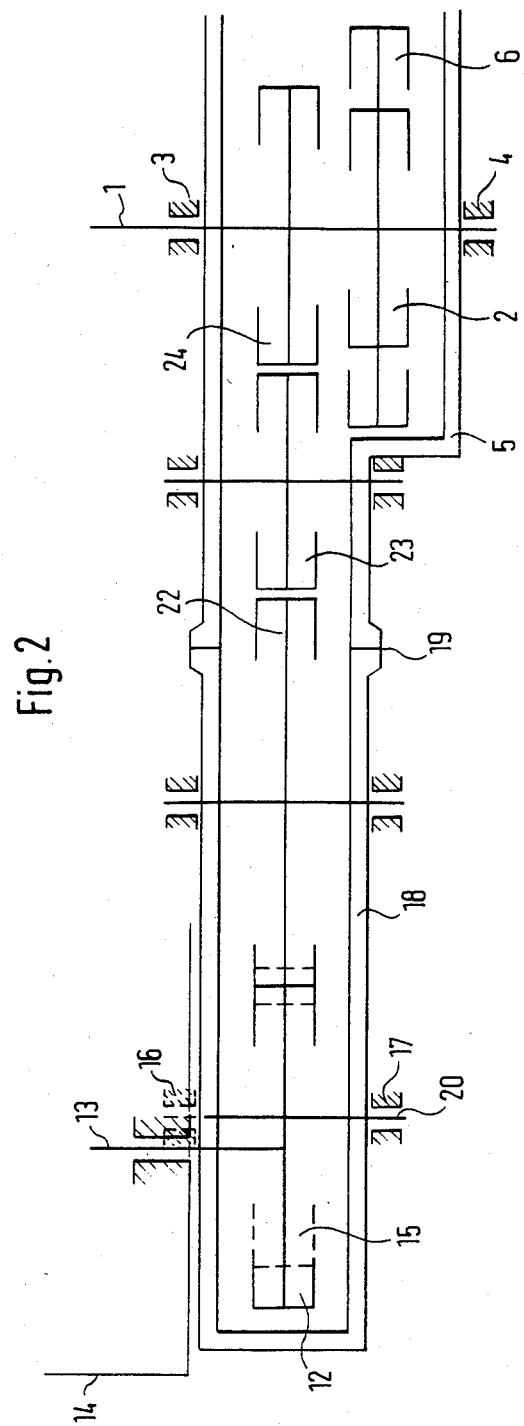
FIG. 2 is a top schematic view of the gear drive arrangement of FIG. 1 and the bearings therefor.

A crank shaft gear 2 is fixedly connected at the crank shaft 1 and is borne at bearings 3 and 4 of the crank shaft housing 5. The crank shaft gear wheel 2 drives a larger gear wheel 6 disposed below the same, the shaft of which gear wheel 6 is borne in crank housing 5 and extends parallel to the crank shaft 1. The axial middle 7 of the gear wheel 6 is disposed on a line 8 extending perpendicular to the connection line 9 between the axial middle 10 of the crank shaft gear 2 and the axial middle 11 of the cam shaft gear 12. Cam shaft gear 12 is fixedly connected to the cam shaft 13 and together with cam shaft 13 is rotatably borne in the light metal cylinder head 14. A gear wheel 15 drivingly intermeshing with cam shaft gear wheel 12 is rotatably carried in the bearings 16, 17 of a gear housing 18 that is flangely connected at the separating position 19 to the crank housing 5. The axial middle 20 of the gear wheel 15 is disposed at a small distance S from the perpendicular 21 of the connection line 9 and forms, with the illustrated selected gear wheel sizes, an angle of approximately 87° to the connection line 9 (angle between line 9 and a line through points 11 and 20). The gear wheel 15 drivingly engages with a gear wheel 22 that is likewise rotatably carried in the gear housing 18 and is in driving connection with a gear wheel 24 via a gear wheel 23 rotatably borne in the crank housing 5, which gear wheel 24 is disposed on the same shaft as the gear wheel 6 engaging with the crank shaft gear wheel 2.

With a six cylinder boxer type engine for which the inventive cam shaft drive can be used, upon a warm up of the engine, the distance of the cam shaft relative to the axial middle of the gear weel 15 increases in about 40 seconds approximately 1 millimeter (1 mm) in the direction of the connection line 9. With the invention it is possible to compensate for this difference in distance through a curve shaped roll off movement of the cam shift gear wheel 12 around the axial middle 20 of the gear wheel 15 so that the torsional flank "play" at the gripping teeth is not enlarged. At best, one achieves this goal best by arranging that the axial middles, 10, 11, 20, 7 of the crank shaft gear wheel 2, the cam shaft gear wheel 12, the gear wheel 15, as well as the gear wheel 6 form the corner points of a rectangle 25.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Driving gear arrangement for a cam shaft bearingly supported in the cylinder head of a combustion engine, the driving gear arrangement comprising toothed gear transmission means for connecting the engine crank shaft to the cam shaft, the transmission means including a cam shaft toothed wheel on the cam shaft, a crank shaft toothed wheel on the crank shaft, and a plurality of intermediate toothed gear wheels, the cylinder head being heated to a thermal elongation-inducing temperature during operation of the combustion engine, the intermediate gear wheels being arranged partly at the frontal side in a crank shaft housing and partly in a gear housing flangedly connected to the crank shaft housing, wherein one of the intermediate toothed gear wheels is rotatably engaged with the cam shaft toothed gear wheel to position the axial middle of the one intermediate gear along an outgoing line extended from the axial middle of the cam shaft toothed wheel in one of a collinear relation and an inclined relation to a perpendicular reference line that is perpendicular to a connection line connecting the axial middles of the crank shaft toothed gear wheel and the cam shaft toothed gear wheel to permit the axial middle of the cam shaft toothed gear wheel to move along an arcuate path about the axial middle of the one intermediate gear wheel in response to thermal elongation of the cylinder head induced by heating the cylinder head during operation of the combustion engine.

2. Cam shaft driving gear arrangement according to claim 1, wherein another of the toothed intermediate gear wheels is rotatably engaged with the crank shaft toothed gear wheel, and the axial middles of the crank shaft toothed gear wheel, the cam shaft toothed gear wheel, the one toothed intermediate gear wheel, and the other intermediate toothed gear wheel are located approximately at the corners of a rectangle.

3. Cam shaft driving gear arrangement according to claim 1, wherein the cam shaft toothed gear wheel is surrounded by the gear housing.

4. Cam shaft driving gear arrangement according to claim 1, wherein the toothed wheels are made of a steel alloy and the crank shaft housing, the cylinder head, as well as the gear housing are made of an aluminum alloy.

5. Cam shaft driving gear arrangement according to claim 2, wherein the cam shaft toothed gear wheel is immediately fastened at the cam shaft and is surrounded by the gear housing.

6. Cam shaft driving gear arrangement according to claim 1, wherein the outgoing line is inclined no more than 30° from the perpendicular with respect to the connection line.

7. Cam shaft driving gear arrangement according to claim 1, wherein the outgoing line is inclined between 0° and 3° from the perpendicular with respect to the connection line.

8. A gear train assembly for rotating a cam shaft rotatably supported in a cylinder head of a combustion engine in response to rotation of a crank shaft, the cylinder head being formed of a thermally elongatable material and heated to a high thermal elongation-inducing temperature during a combustion activity within the engine, the gear train assembly comprising:

a gear housing fixed in spaced relation to the cylinder head, a crank shaft housing fixed in spaced relation to the cylinder head and rigidly connected to the gear housing, the crank shaft being rotatably supported in the crank shaft housing, each of the gear housing and the crank shaft housing being heated to a relatively lower temperature due to the remoteness of the combustion activity from the gear and crank shaft housings, a cam shaft planet gear fixed to the rotatable cam shaft to define a first axial gear center, a crank shaft gear fixed to the rotatable crank shaft to define a second axial gear center, the first and second axial gear centers cooperating to define a connection line connecting the cam shaft planet gear and the crank shaft gear, and intermediate gear means for rotating the cam shaft planet gear in response to rotation of the crank shaft gear, the intermediate gear means including a sun gear in engagement with the cam shaft planet gear, the sun gear being fixed to the gear housing for rotation about a third axial gear center disposed along an outgoing line extended from the first axial gear center in a direction in one of a collinear relation and an inclined relation to a perpendicular reference line that is perpendicular to the connection line to permit the cam shaft planet gear to move in epicyclic relation to the relatively fixed sun gear in response to thermal elongation of the cylinder head when the cylinder head is exposed to the thermal elongation-inducing temperature during combustion activity in the engine.

9. The gear train assembly of claim 8, wherein the cam shaft planet gear is surrounded by the gear housing.

10. The gear train assembly of claim 8, wherein the gears are made of a steel alloy, and each of the cylinder head, the gear housing, and the crank shaft housing is made of an aluminum alloy.

11. The gear train assembly of claim 8, wherein the outgoing line is inclined in relation to the line perpendicular to the connection line at a selected angle between 0° and 30°.

* * * * *